US006074131A

United States Patent [19]

Daul et al.

[11] Patent Number: 6,074,131

[45] Date of Patent: Jun. 13, 2000

[54] METHOD FOR INSTALLING FORM IN-PLACE DISPENSER CONTAINMENT

[75] Inventors: Charles M. Daul, Libertyville; Paul A. Sivak, Compton; David Lyzinski, Wheaton; Albert J. Kovach, Sugar Grove, all of Ill.

[73] Assignee: BP Amoco Corporation, Chicago, Ill.

[21] Appl. No.: 09/000,706

[22] Filed: Dec. 30, 1997

Related U.S. Application Data

[60] Provisional application No. 60/034,121, Dec. 31, 1996.

[51] Int. Cl.[7] .............................. B65G 5/00; E21D 11/00; E21D 11/38

[52] U.S. Cl. .......................... 405/55; 405/150.2; 405/303; 588/259; 264/31

[58] Field of Search .................................. 405/52, 53, 55, 405/128, 129, 150.1, 150.2, 303; 588/249, 259; 427/421; 264/31, 35

[56] References Cited

U.S. PATENT DOCUMENTS

| | | | |
|---|---|---|---|
| 4,682,911 | 7/1987 | Moreland | 405/53 |
| 4,818,151 | 4/1989 | Moreland | 405/53 X |
| 4,934,866 | 6/1990 | Gage | 405/55 X |
| 5,332,335 | 7/1994 | Daul | 405/53 |

*Primary Examiner*—Eileen Dunn Lillis
*Assistant Examiner*—Tara L. Mayo
*Attorney, Agent, or Firm*—Robert A. Yesukevich; Frank J. Sroka

[57] ABSTRACT

A method of upgrading the area below a dispenser to contain accidental release harmful materials from contaminating the soil below grade without repiping, electrical changes, or concrete disruption.

4 Claims, 3 Drawing Sheets

METHOD FOR INSTALLING FORM IN-PLACE DISPENSER CONTAINMENT

CROSS REFERENCE TO RELATED APPLICATION

This application claims the benefit of U.S. Provisional Application No. 60/034,121, filed Dec. 31, 1996.

FIELD OF THE INVENTION

The invention relates to upgrading unprotected areas below fuel dispensers that currently do not have spill containment with a form in-place dispenser secondary containment system to prevent environmental contamination.

BACKGROUND OF THE INVENTION

Most fuel dispensers located at service stations or other fueling areas are set on a concrete pad with associated underground piping attaching to the dispenser from below as shown in FIG. 1. This area under the dispenser is unprotected and any spills or leaks will fall directly to the soil beneath resulting in contamination of soil and/or groundwater.

A secondary containment system is a system that collects and contains fluids that leak out of another and primary containment system. For example, a primary containment system may store and deliver hydrocarbon fuels, such as gasoline and diesel oil, at a fueling station. A secondary containment system collects and contains that same fuel if a primary tank or delivery pipe should rupture or otherwise spill the gasoline. A secondary containment system also catches fuel that spills when a fill tube runs over while a fuel storage tank is being filled, for example. While the invention is described hereinafter in connection with a hydrocarbon fuel filling station storage and delivery system, it should be understood that the invention may also be used to protect any other suitable primary containment system.

The fuel dispensers in a filling station undergo routine maintenance on a regular basis. For example, the filters in a dispenser are typically changed once per month. When a filter is changed a portion of the fuel present in the dispenser downstream of the filter may drip onto the ground beneath the dispenser, even when all precautions are taken. Over an extended period of such occurrences, there may be a potential pollution problem.

Fuel spillage can also occur when less frequent types of repair work, such as meter changes, are performed on the fuel dispensers. Therefore, fuel spillage due to this type of repair work can also pose a significant pollution problem even though it occurs on an irregular basis. Also, dispensers can develop slow leaks at gaskets or other points despite regular maintenance. Such slow leaks allow a steady trickle of fuel to drain onto the ground.

With the advent of more stringent environmental regulation, it is important to attempt to contain any fuel spillage and prevent passage of such spillage to the ground, where absorption can require removal an treatment of the contaminated ground material. Hence, it is highly desirable to provide a secondary containment system for spillage from a fuel dispenser.

A number of such systems are currently available, and they include sumps, pans, bags or other devices for use under dispensers to catch spills or drips. A common characteristic of most of these systems is that they are each prefabricated so as to have holes and closure fittings therein that are properly sized and positioned to permit the various product piping and electrical conduits associated with the particular dispenser with which it is to be used, to extend through such holes and to be liquid tight so as not to let liquids enter or escape the secondary containment system. The many different dispensers involve many different types and arrangements of product piping and electrical conduits. Thus, many different styles and types of secondary containment systems are required. Furthermore, most of these secondary containment systems require that the dispensers be placed out of service during installation, which can be an expensive proposition.

Another type of secondary system, described in U.S. Pat. No. 5,332,335, owned by the assignee of this application, uses a form in-place fabrication process to accommodate a wide variety of installations without requiring a large variety of special prefabricated parts and fittings, and without any downtime during installation. However, the thermoset resin materials for such secondary containment systems are subject to shrinkage and deformation over time, resulting in stress cracks and potential leaks of the secondary containment system.

SUMMARY OF THE INVENTION

The invention overcomes the limitation of prior art secondary containment systems with a flexible, form in-place containment pan that is not subject to cracking due to shrinkage or deformation. It requires no special custom hardware and it may be installed with no fueling station downtime.

The invention involves two steps to upgrade the area under a dispenser in a manner that will prevent spills from entering the soil. The first step entails forming the sidewalls of the form in-place containment pan using a gasoline and other hydrocarbon fuel resistant rubber compound, or any other suitable gasoline and other hydrocarbon resistant, flexible material, as shown in FIG. 2. This compound should provide adequate thickness to effectively seal all cracks, holes, gaps, etc. in the existing side structure whether made of metal or concrete or other material. The sidewall must adhere to the existing sidewalls under all adverse conditions such as freezing and trawling and must not crack.

The second step of the invention involves completing the form in-place pan by pouring a flexible floor as shown in FIG. 3. The material used for the floor must adhere to or chemically bond with the polymer sidewall formed in step one and all associated metal or plastic piping conduits, or other penetrations and must be flexible enough to provide an effective seal if movement of the subsurface occurs. This material must not shrink away from any surface and be fully resistant to gasoline of all grades or any other hydrocarbon fuel.

DETAILED DESCRIPTION OF THE PREFERRED EMBODIMENT

Figure 1:
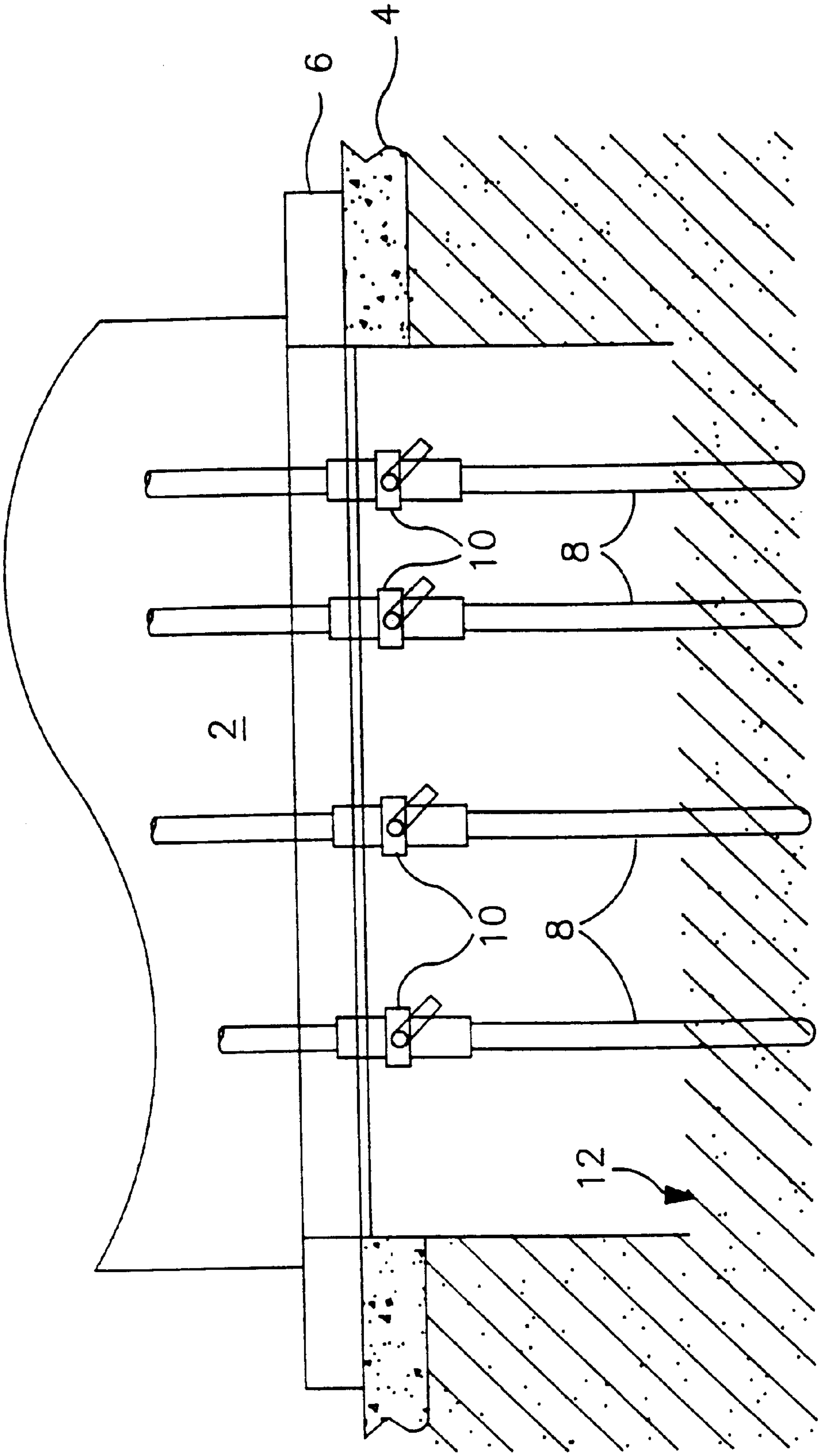
FIG. 1 shows a cut away view of a typical fuel dispenser.

Referring to the drawings, wherein reference characters describe like or corresponding parts throughout the views, FIG. 1 shows a cut away view of a typical fuel dispenser 2. The dispenser is typically raised above the pavement 4 with a concrete structure commonly referred to as a dispenser island 6. Pipes 8 from the underground storage tanks (not shown) enter the dispenser from below ground. Each of the pipes 8 have a safety valve commonly referred to as a shear valve 10 that automatically shuts off should the dispenser 2 be knocked over or moved through accidental contact. A subsurface area 12 below the dispenser is normally unprotected and consists of gravel, crushed stone, sand or soil.

Figure 2:
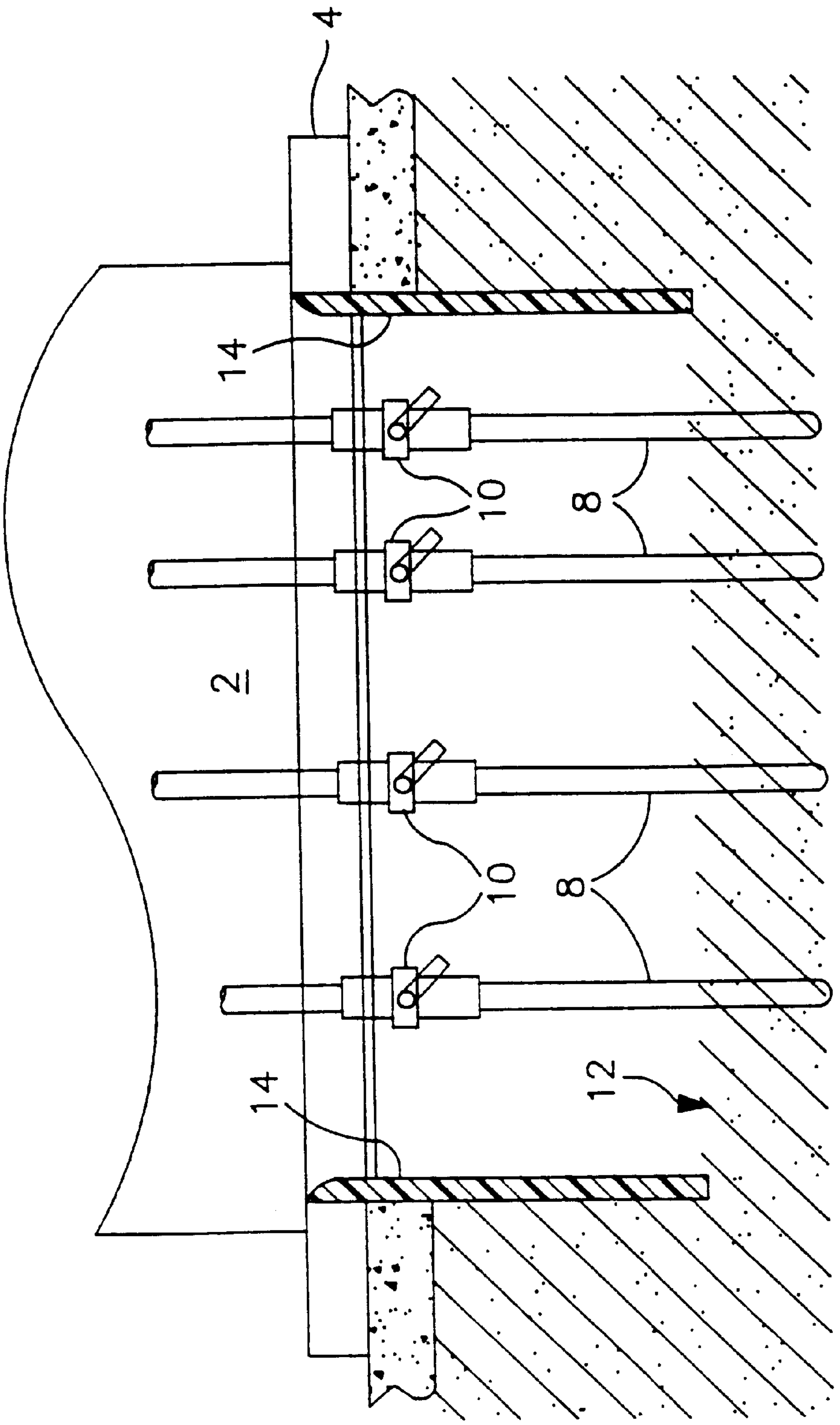
FIG. 2 shows the first step of the upgrade process.

FIG. 2 shows the first step of the upgrade process. The existing subsurface area 12 below the dispenser is cleared of loose debris, rust, stone or gravel. Additionally, this subsurface area 12 may be cleaned with a sparkless wire brush to ensure proper adhesion of elastomeric or polymeric materials. A preferred embodiment is to spray the cleaned subsurface area 12 with a suitable primer such as THIOKOL TPR-415. A self-supporting elastomeric or polymeric material is then either smoothed in place, such as by trawling, or sprayed in place to form a liquid tight sidewall barrier 14. A preferred material for this use THIOKOL T-2235-M, a two part polysulfide rubber system.

Figure 3:
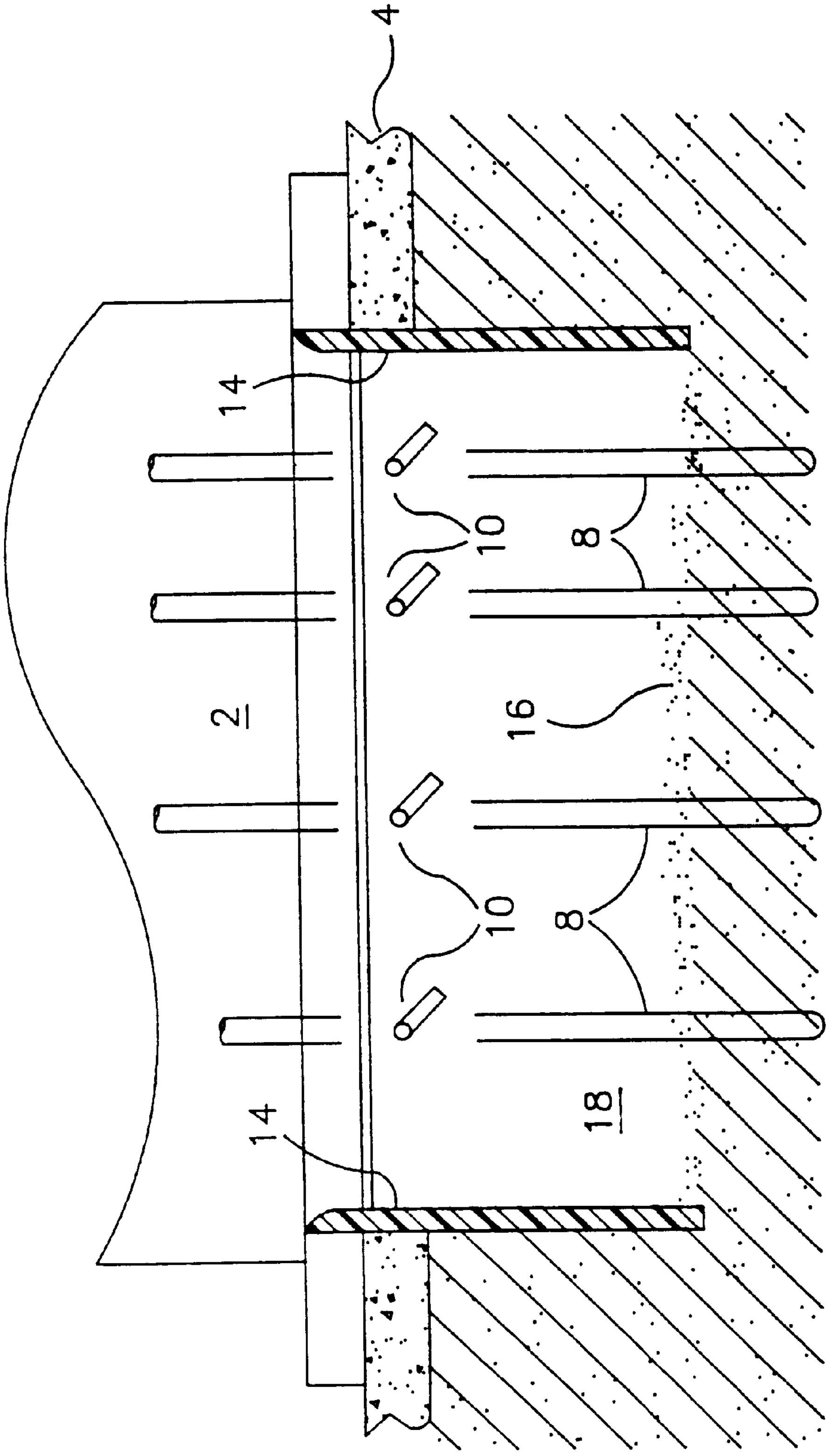
FIG. 3 shows the second step of the upgrade process.

FIG. 3 shows the second step of the upgrade process. A gasoline and other hydrocarbon fuel resistant elastomer or polymer is either poured, sprayed or troweled into place to form a liquid tight floor 16. This material must bond either physically or chemically to the sidewall barrier 14 and to all associated metal, plastic or other penetrations of the form in-place containment system. The sidewall barrier 14 and floor 16 then form a liquid tight flexible containment system 18. A preferred embodiment is the use of Morton-THIOKOL RLP-2378G or RLP-2078, two part polysulfide rubber material that easily pours and is self leveling. A second embodiment is the use of a trawlable material, such as THIOKOL T-2235-M, as described above to form the sidewall barrier 14. The advantage of the pourable material is that all of the voids along the area of the floor 16 and the seams between the sidewall barrier 14 and the floor 16 are completely filled due to the self-leveling and flowing nature of this material.

While only certain embodiments have been set forth, alternative embodiments and various modification will be apparent from the above description to those skilled in the art. These alternatives are considered equivalents and within the spirit and scope of the present invention.

What is claimed is:

1. A method of containing spillage of hydrocarbon fuel under a hydrocarbon fuel dispenser, comprising the steps of:

providing a hydrocarbon fuel dispenser and an under-dispenser support surface, the hydrocarbon fuel dispenser being disposed above and supported by the under-dispenser support surface, and the under-dispenser support surface defining side areas and a floor area;

applying a self-supporting first coating selected from a group of elastomeric and polymeric coatings onto the side areas of the under-dispenser support surface to form a flexible, liquid tight sidewall barrier; and applying a second coating selected from a group of elastomeric and polymeric coatings onto the floor area of the under-dispenser support surface to form a flexible, liquid tight under-dispenser containment receptacle having a flexible, liquid tight floor area which is bonded to the sidewall barrier.

2. The method set forth in claim 1, wherein said step of applying said self-supporting first coating further comprises trawling said self-supporting coating onto said side areas and said step of applying said second coating further comprises trawling said second coating onto said floor area.

3. The method set forth in claim 1, wherein said step of applying said self-supporting first coating further comprises trawling said self-supporting coating onto said side areas and said step of applying said second coating further comprises pouring said second coating onto said floor area.

4. The method set forth in claim 1, wherein said step of applying said self-supporting first coating further comprises spraying said self-supporting coating onto said side areas and said step of applying said second coating further comprises spraying said second coating onto said floor area.

* * * * *

UNITED STATES PATENT AND TRADEMARK OFFICE

CERTIFICATE OF CORRECTION

PATENT NO. : 6,074,131

DATED : June 13, 2000

INVENTOR(S) : Charles M Daul, Paul A. Sivak, David Lyzinski, Albert J. Kovach

It is certified that error appears in the above-identified patent and that said Letters Patent is hereby corrected as shown below:

| | | |
|---|---|---|
| 3 | 13,14 | "THIOKOL TPR-415."<br><br>should read:<br>"THIOKOL ® TPR-415." |
| 3 | 17 | "THIOKOL T-2235-M,"<br><br>should read:<br>"THIOKOL ® T-2235-M," |

UNITED STATES PATENT AND TRADEMARK OFFICE

CERTIFICATE OF CORRECTION

PATENT NO. : 6,074,131

DATED : June 13, 2000

INVENTOR(S) : Charles M. Daul, Paul A Sivak, David Lyzinski, Albert J. Kovach

It is certified that error appears in the above-identified patent and that said Letters Patent is hereby corrected as shown below:

| | | |
|---|---|---|
| 3 | 27,28 | "Morton-THIOKOL RLP-2378G"<br><br>should read:<br>"THIOKOL ® RLP-2378G" |
| 3 | 30,31 | "THIOKOL T-2235-M,"<br><br>should read:<br>"THIOKOL ® T-2235-M," |

Signed and Sealed this

Twenty-ninth Day of May, 2001

Attest:

NICHOLAS P. GODICI

*Attesting Officer*

*Acting Director of the United States Patent and Trademark Office*